April 23, 1929.  G. R. METCALF, JR  1,710,060

CONDUIT FITTING

Filed Sept. 8, 1927

George R. Metcalf Jr
INVENTOR.

BY
ATTORNEYS.

Patented Apr. 23, 1929.

1,710,060

UNITED STATES PATENT OFFICE.

GEORGE R. METCALF, JR., OF ERIE, PENNSYLVANIA, ASSIGNOR TO ERIE MALLEABLE IRON COMPANY, OF ERIE, PENNSYLVANIA, A CORPORATION OF PENNSYLVANIA.

CONDUIT FITTING.

Application filed September 8, 1927. Serial No. 218,325.

Knock-out boxes are provided with comparatively thin walls and are usually formed of sheet metal, or at least thin walled material and ordinarily have no projections from the wall. For this reason difficulty has been experienced in connecting conduits to these openings in such a manner that the conduits may be rigidly attached to the wall. The present invention forms a simple and efficient means by which the conduit may be connected to such a wall and very cheaply formed.

A preferred embodiment of the invention is illustrated in the accompanying drawings as follows:—

Figure 1:
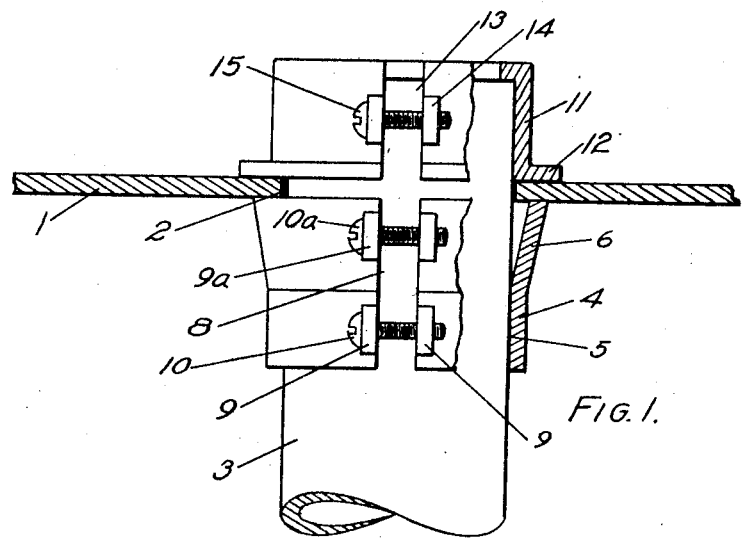

Fig. 1 shows a sectional view of a conduit connection with a knock-out box.

Figures 2, 4:
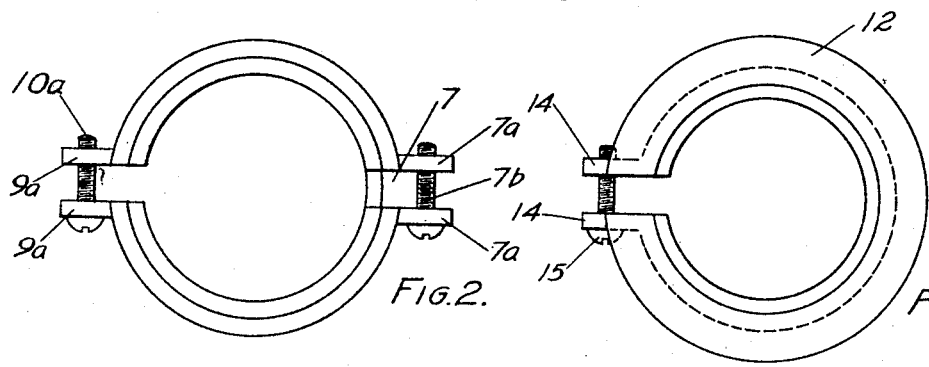

Fig. 2 a front elevation of the outer securing means.

Figures 3, 5:
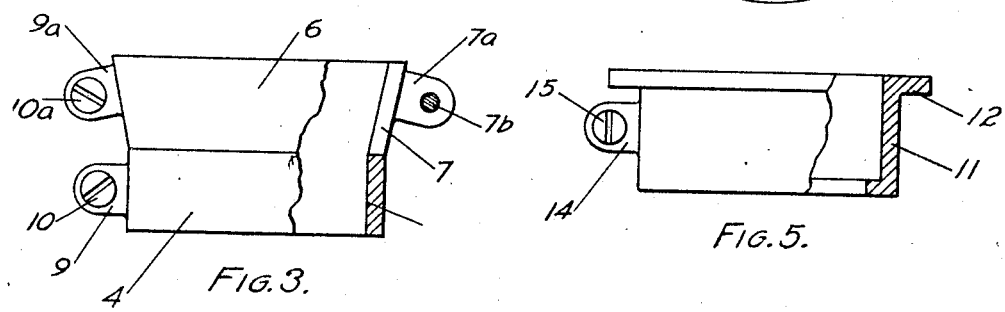

Fig. 3 a side elevation of the same.

Fig. 4 a rear elevation of an inside sleeve.

Fig. 5 a side elevation of the same.

1 marks the wall of a knock-out box, or fitting, 2 a conduit opening therein, and 3 a conduit arranged in the opening.

A securing sleeve 4 surrounds the conduit at the outer face of the wall. This has a cylindrical portion 5 which contacts the conduit and a flaring portion 6 which engages the wall. The sleeve is severed at 8 and ears 9 are arranged in the cylindrical portion 5 for clamping this portion to the conduit and ears 9ª are arranged on the flaring portion 6. The flaring portion also has a slot 7 opposite the slot 8 which extends through the flaring portion only. Ears 7ª are provided at each side of the slot 7 and a screw 7ᵇ extends through these ears. A screw 10 extends through one of the ears 9 and screws into the opposing ear. A screw 10ª operates similarly in the ears 9ª.

An inner sleeve 11 has a flange 12 which engages the inner face of the wall of the fitting. This sleeve is severed at 13 and has ears 14 at the edges of the slit. A screw 15 extends through the ear at one edge and through a screw-threaded perforation in the opposite ear. Thus the inner sleeve may be contracted into engagement with the conduit with the flange in engagement with the wall.

In placing the fitting the inner sleeve is clamped in engagement with the inner face of the wall. The outer sleeve is pushed up against the wall and the cylindrical portion clamped to the conduit through the action of the screw 10. After this clamping is affected the screws 10ª and 7ᵇ are tightened. The effect of this is to bring the flared portion of the sleeve 4 inwardly and this crowds the inner edge of this flared portion with a clamping action against the face of the box, thus forming a rigid connection between the conduit and the box.

What I claim as new is:—

1. In a conduit fitting, the combination of a box wall having a conduit opening therein; a conduit in the opening; means for locking the conduit against endwise withdrawal movement relatively to the inner surface of the wall; a sleeve engaging the conduit having a flaring portion engaging the outer wall of the box; and means for successively contracting the sleeve into engagement with the conduit and then springing the flaring portion into engagement with the wall of the box.

2. In a conduit fitting, the combination of a box wall having a conduit opening therein; a conduit in the opening; an inner sleeve engaging the conduit within the wall and engaging the inner surface of the wall; an outer sleeve engaging the conduit having a flaring portion engaging the outer wall of the box; and means for successively contracting the sleeve into engagement with the conduit and then springing the flaring portion into engagement with the wall of the box.

3. In a conduit fitting, the combination of a box wall having a conduit opening therein; a conduit in the opening; means forming a shoulder on the conduit engaging the inner surface of the wall; a sleeve on the conduit without the wall, said sleeve having a cylindrical portion and a flaring portion, said sleeve being longitudinally slitted and having ears on the cylindrical portion and ears on the flaring portion adjacent to the slit and screws extending through said ears.

4. In a conduit fitting, the combination of a box wall having a conduit opening therein; a conduit in the opening; a flanged sleeve within the conduit; means for clamping the sleeve on the conduit with the flange in engagement with the inner surface of the wall; a sleeve on the conduit without the wall, said sleeve having a cylindrical portion adapted to engage the conduit and a flaring portion adapted to engage the surface of the box, said sleeve being longitudinally slitted and having ears adjacent to the slit in the cylindrical portion and in the flaring portion; and screws in said ears.

5. In a conduit fitting, the combination of a box wall having a conduit opening therein; a conduit in the opening; a flanged sleeve within the conduit; means for clamping the sleeve on the conduit with the flange in engagement with the inner surface of the wall; a sleeve on the conduit without the wall, said sleeve having a cylindrical portion adapted to engage the conduit and a flaring portion adapted to engage the suface of the box, said sleeve being longitudinally slitted with ears adjacent to the slit in the cylindrical portion and the flaring portion, said sleeve having an auxiliary longitudinal slit extending through the flaring portion and opposite said first slot with ears adjacent to the slit; and screws in said ears adapted to contract the sleeve.

6. A conduit fitting comprising a split sleeve, said sleeve having a cylindrical portion and a flaring portion with ears on the cylindrical portion and ears on the flaring portion adjacent to the split; and screws through said ears.

7. A conduit fitting comprising a split sleeve, said sleeve having a cylindrical portion and a flaring portion with ears on the cylindrical portion and ears on the flaring portion adjacent to the split; screws through said ears, said sleeve also having an auxiliary slit extending through the flaring portion only; ears adjacent to the auxiliary slit; and a screw through said last-mentioned ears.

8. In a conduit fitting, the combination of a box wall having a conduit opening therein; a conduit in the opening; means locking the conduit against endwise movement in one direction relatively to one surface of the wall; a sleeve engaging the conduit and having a flaring portion engaging the other surface of the wall; and means for successively contracting the sleeve into engagement with the conduit and then springing the flaring portion into engagement with the wall of the box.

In testimony whereof I have hereunto set my hand.

GEORGE R. METCALF, Jr.